Oct. 3, 1933.  H. M. JOHNSTON  1,929,386
DEVICE FOR DISTRIBUTING FERTILIZER, SEED, OR LIKE MATERIAL
Filed Nov. 15, 1932   2 Sheets-Sheet 1
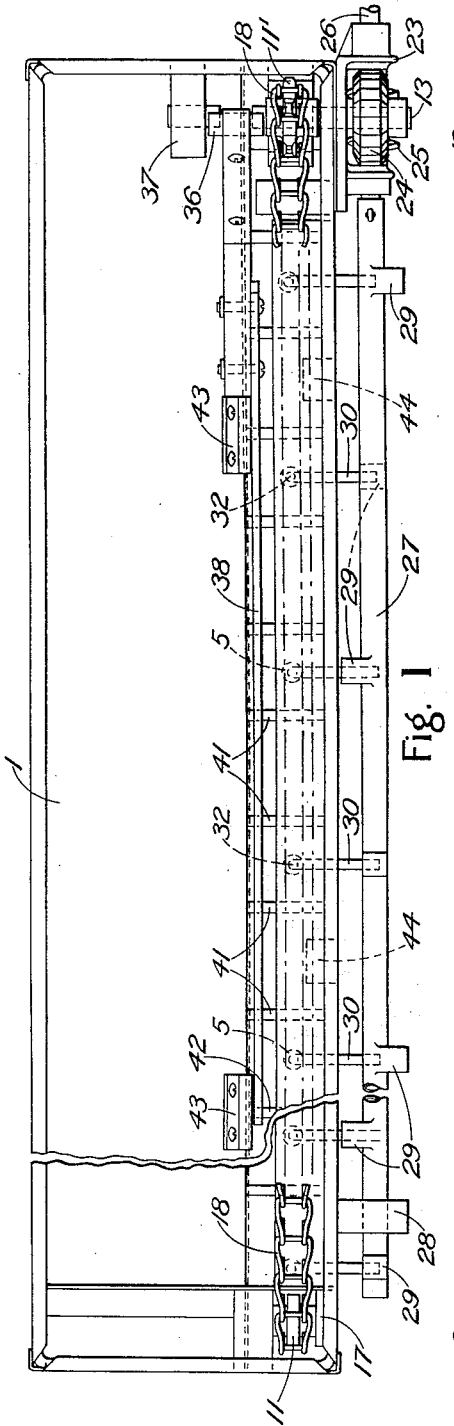
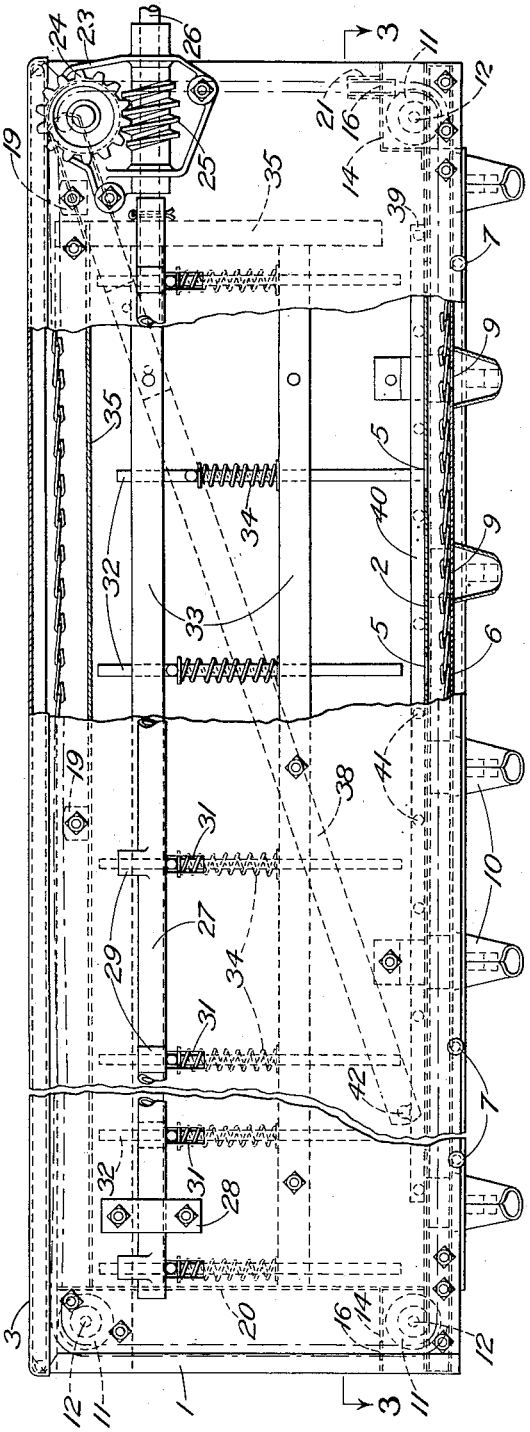
INVENTOR:
HOWARD M. JOHNSTON
BY  ATTORNEY.

Oct. 3, 1933.   H. M. JOHNSTON   1,929,386
DEVICE FOR DISTRIBUTING FERTILIZER, SEED, OR LIKE MATERIAL
Filed Nov. 15, 1932   2 Sheets-Sheet 2
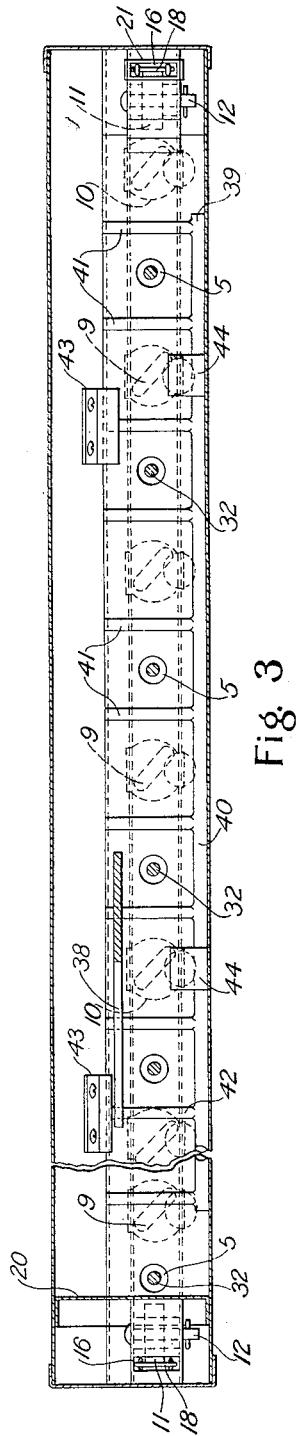
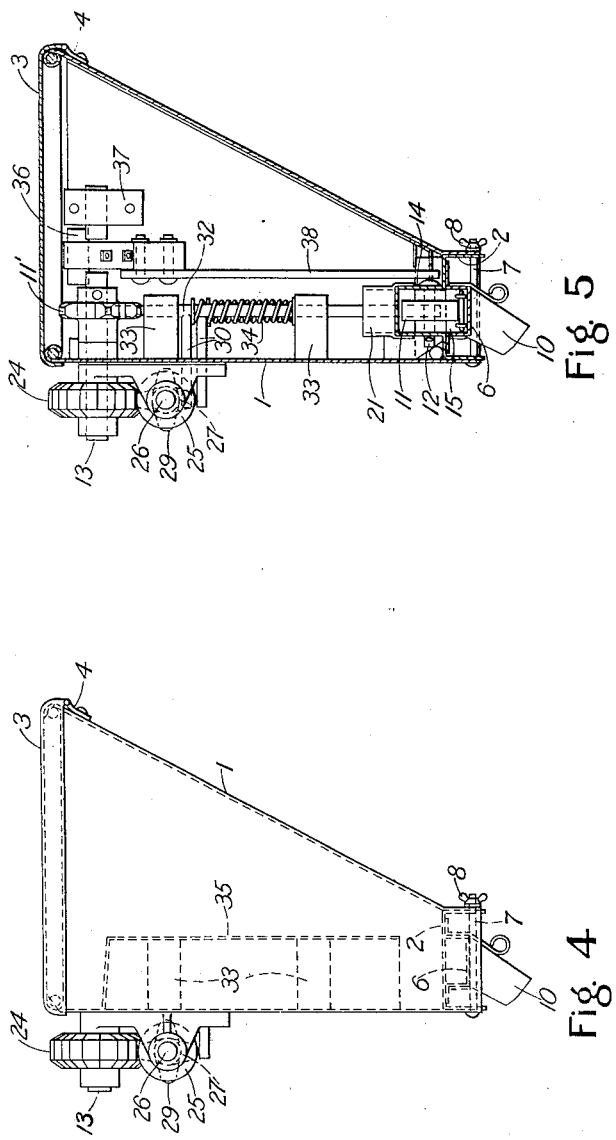
INVENTOR:
HOWARD M. JOHNSTON
BY   ATTORNEY.

Patented Oct. 3, 1933

1,929,386

UNITED STATES PATENT OFFICE 1,929,386

DEVICE FOR DISTRIBUTING FERTILIZER, SEED, OR LIKE MATERIAL

Howard Milton Johnston, Toronto, Ontario, Canada, assignor to Massey-Harris Company, Limited, Toronto, Ontario, Canada Application November 15, 1932
Serial No. 642,719

16 Claims. (Cl. 221—128)

This invention relates to devices for distributing fertilizer, seed or like materials which may be made of separate portable apparatus or as attachments for existing seed drills or analogous machine.

The invention has for object to provide a device which is of simple construction having but few moving parts, and in which those parts which are not stationary move slowly, so that the device is strong, durable and reliable.

A further object of the invention is to provide a device, which insures an even and continuous distribution of the material, in which the motion of all the moving parts is synchronized and varies only with the speed of travel of the machine, in which the operative parts are maintained clean and free from obstruction and in which all parts are readily accessible for repair or the like.

Machines have been proposed comprising boxes for containing the material and endless chain members for feeding the material through perforations, but in these instances the chains operate above the bottom of the box, so that they had to bear the weight of the material in the box. This construction gives rise to disadvantages and the distribution of the material is not even.

According to the present invention the operative part of the feed chain is disposed in a channel below the box, the arrangement being such that a steady supply of material is fed into the trough and conveyed by the chain to distributing spouts.

Further features of the invention will be hereinafter described.

The invention consists in the construction, combination and arrangement of parts hereinafter described and more particularly pointed out in the appended claims.

Referring now to the accompanying drawings which illustrate, by way of example, one convenient embodiment of the invention, Figure 1 is a plan view of the improved device with cover removed;

Figure 2 is a front elevation with part of the hopper broken away;

Figure 3 is a section on line 3—3 of Figure 2;

Figure 4 is a side elevation looking on the right-hand end of Figure 2; and

Figure 5 is also a side elevation with end of hopper, shield for plungers and feed chain removed.

The device illustrated in the drawings comprises a hopper 1 of any desired length. The hopper may be open at the top with downwardly converging front and rear walls, as shown in Figures 4 and 5, and is provided with a bottom 2, which may be bolted in place, and a cover 3, hinged as at 4.

A series of holes 5, preferably circular, are provided in the bottom 2. A chain trough or channel 6 is detachably mounted under the bottom 2, being held in place by means of bolts 7 and wing-nuts 8.

In the bottom of channel 6, openings 9 are provided which are preferably in the form of slots, as indicated in Figure 3. The slots have the same spacing as the holes 5, but are displaced forwardly a few inches with respect to the direction of travel of the chain to be later described. Spouts or chutes 10 are provided on the bottom of the channel 6 beneath each slot 9, and the slots are preferably arranged diagonally of the chutes, as shown in Figure 3.

Rollers 11 are mounted on axles 12 at the bottom ends of the hopper and at one end of the top, while at the other end at the top a sprocket 11' is mounted on a shaft 13. The axles 12 of the lower rollers are carried by housings 14 surrounding the rollers. The housings 14 are open at the bottom and the lower rollers 11 project downwardly through openings 15 in the hopper bottom into the chain trough. Small rectangular openings 16 are provided in the tops of the housings. The axle 12 of the upper roller is carried by a bearing block 17 bolted to the walls of the hopper.

The rollers and the sprocket are disposed in substantially the same vertical plane, and arranged to run over them is an endless feed chain 18. The lower stretch of the chain extends along the trough formed by the channels 6, and rests on the bottom thereof. The vertical stretches extend up through the openings 16 in the housings 14. The top stretch extends across the upper part of the hopper being supported at suitable intervals by blocks 19 bolted to one of the walls of the hopper (see Figure 2), the number of blocks required depending on the length of the device.

A vertical partition 20 is provided a short distance from one end of the hopper, and a small boxing 21, surrounding the feed chain 18, is mounted on the housing 14 above the opening 16 therein, at the other end of the hopper.

The sprocket 11' is used for driving the chain 18 and its shaft 13 is extended through the wall of the hopper and through a bearing in a casting 23. The means provided for driving the axle of the sprocket consists of a drive pinion 24 mounted on the shaft 13 and adapted to be actuated by means of a worm 25 mounted in bearings in the casting 23. The shaft 26 of the worm 25 may be driven in any suitable known manner from the ground wheels of the machine on which the device is mounted.

The end of the shaft 26 projects somewhat from the inner end of the worm 25 and mounted thereon, for direct drive therewith, is a cam shaft 27 suitably supported by one or more bearings 28 bolted to the hopper. The shaft 27 carries a series of cams 29 adapted for engagement with a series of rods 30 projecting through openings 31 in the hopper wall and mounted at their inner ends on vertical plungers 32. The plungers 32 are slidably mounted in guide supports 33, bolted to the wall of the hopper. The plungers are mounted so that their lower ends are directly above the holes 5 in the bottom 2. Springs 34 are mounted on the plungers 32 between the supports 33, and serve to return the plungers to their normal position on disengagement of the cam action. The plungers are completely shielded by means of the partitions or shield 35.

The inner end of the shaft 13 is provided with a crank 36, the end of which is mounted in a bearing 37. A pitman shaft 38 is mounted on the crank 36, and is adapted to drive a distributor or agitator 39, consisting of a rod 40, having fingers 41 projecting therefrom and adapted to slide in alternate directions along the bottom 2 of the hopper. The pitman shaft 38 is connected to the agitator by means of the rod 42. The agitator is retained in position by means of clips 43 and bearing blocks 44.

A supply of fertilizer, seed or the like, is placed in the hopper 1 and during operation the agitator 39 will distribute the same evenly along the bottom 2 of the hopper. The plungers 32 are operated in a fixed sequence by the cams 29 to project downwardly into the holes 5, thus preventing the holes 5 from becoming blocked and tending to force or assist a supply of material through the holes 5 and into the chain trough 6, where it is scraped along by the chain 18 until it arrives at a slot 9, through which it drops into the spout 10 beneath. From the spouts 10 the fertilizer or seed falls by gravity to the ground in the usual manner; for example, through flexible tubes leading to discs, or otherwise, according to the type of machine to which the device is attached.

Pressure of air within the plunger chamber prevents the material from being forced upwards therein.

The agitator and plungers are synchronized in operation so as to ensure the feeding of a steady, even stream of material through the holes 5 into the trough 6.

The housings 14, partition 20 and boxing 21 prevent the material from entering the chain trough and keep the chain clean. The shield 35 effectively protects the plunger mechanism.

The snapback of the plungers into their normal position by means of the springs 34 causes a certain amount of vibration which effectively assists in the distribution of the material and prevents the formation of pockets therein.

The cover 3 extends over the edges of the hopper thus rendering the same waterproof.

Since the parts of the device which are not stationary move very slowly, a reliable operation is assured and chucks and stoppages practically eliminated.

It will be noted that the lower part of the chain is not subjected to the weight of material in the box, and also that the chain in travelling through the hopper is practically free from contact with the material therein and thus is able to free itself of any material which may have been carried up by it. Thus the chain automatically cleans itself.

The arrangement of the lower part of the chain in a readily detachable channel is very advantageous. In order to inspect or repair the chain or remove obstructions from the trough, it is only necessary to remove the bolts 7 and wingnuts 8, when the trough 6 with the spouts 10 can be bodily removed.

The device can be made as an attachment for a standard grain drill, or can be built into a combination box holding grain on one side and fertilizer on the other. The device is specially suitable for distributing fertilizer, but can be readily adapted for distributing fine seed or the like.

It will be understood that the foregoing description and accompanying drawings are given by way of example only and that various modifications may be made within the scope of the appendend claims without departing from the invention.

What I claim is:

1. A device for distributing fertilizer, seed or like material, comprising a container having a row of perforations in the lower part thereof, a perforated channel member beneath said perforations, an endless flexible feeding member having a portion extending along said channel, and means for continuously driving said flexible member to convey material falling through the perforations in the container to the perforations in the channel.

2. A device for distributing fertilizer, seed or like material, comprising a container having a row of perforations in the lower part thereof, a perforated channel beneath said perforations, an endless flexible feeding member having a portion extending along said channel and a return portion extending across the upper portion of the container, and means for continuously driving said flexible member to convey material falling through the perforations in the container to the perforations in the channel.

3. A device as claimed in claim 1, wherein said channel member is detachably held in position on the container.

4. A device as claimed in claim 1, wherein an agitator is provided extending longitudinally of the container and arranged to distribute the material on the bottom of the container.

5. A device as claimed in claim 1, wherein an agitator is provided extending longitudinally of the container and arranged to distribute the material on the bottom of the container, said agitator comprising a rod having a plurality of fingers extending laterally thereof and adapted to lie on the bottom of the container, and means in association with said rod for imparting backward and forward longitudinal movement thereto.

6. A device as claimed in claim 1, wherein the perforations in the channel member are in the form of slots inclined with respect to the channel and displaced from the container perforations in a forward direction with respect to the direction of travel of said flexible feeding member.

7. A device as claimed in claim 2, wherein means are provided at intervals along the container for supporting the return portion of said flexible feeding member.

8. A device as claimed in claim 2, wherein means are provided at intervals along the container for supporting the return portion of said flexible feeding member and wherein rotatable devices for supporting and guiding said flexible member are mounted at the top and bottom of said compartments, means being provided for driving one of said rotatable devices.

9. A device as claimed in claim 1, wherein means are provided for preventing a blockage of material in the perforations in the lower part of the container.

10. A device as claimed in claim 1, wherein means are provided for preventing a blockage of material in the perforations in the lower part of the container, said means comprising a series of plungers and a series of cams mounted on a cam shaft whereby each of said cams in a fixed rotation is brought into engagement with a plunger to depress the same, and means for returning said plungers to their normal position.

11. In a device for distributing fertilizer, seed or like material, the combination of a container having a series of perforations adjacent the bottom thereof, a detachable slotted trough beneath said perforations, integral spouts depending from the trough beneath said slots, and an endless feed chain, means for guiding and supporting said chain so that its lower portion extends through said trough and the upper portion extends across the upper part of the container above the level of the material.

12. A device for distributing fertilizer, seed or like material, comprising a container having a row of perforations in the lower part thereof, a perforated channel member beneath said perforations, an endless flexible feeding member having a portion extending along said channel, an agitator extending longitudinally of the container and arranged to distribute the material on the bottom of the container, a series of plungers arranged above the perforations in the container and adapted to assist the material therethrough, means for continuously driving said flexible member, and means in association with said last mentioned means for operating said agitator and said plungers.

13. A device as claimed in claim 12, wherein a shield is provided for said plungers.

14. A device as claimed in claim 12, wherein a partition is provided adjacent one end of said container to form a vertically extending compartment open at the top and communicating at the bottom with the channel member.

15. A device as claimed in claim 12, wherein rotatable devices for supporting and guiding said flexible member are mounted at the top and bottom of said container, means being provided for driving one of said rotatable devices, the other rotatable devices being provided with partitioning means for shielding the same from contact with the material.

16. A device as claimed in claim 12, wherein a boxing surrounding said feeding member is provided adjacent one end of the channel.

HOWARD MILTON JOHNSTON.